June 1, 1926. 1,586,907

H. LINWOOD

VEHICLE TIRE

Original Filed Nov. 4, 1925

Inventor.
Harry Linwood,
By George J. Henry
Attorney.

Patented June 1, 1926.

1,586,907

UNITED STATES PATENT OFFICE.

HARRY LINWOOD, OF SAN FRANCISCO, CALIFORNIA.

VEHICLE TIRE.

Original application filed November 4, 1925, Serial No. 66,696. Divided and this application filed March 13, 1926. Serial No. 94,571.

My invention has for its object a vehicle tire which is air tight in that it is adapted to retain a requisite internal air pressure at all times without employment of the so-called inner tube heretofore conventionally used.

My tire is self-locking and of simple integral construction and may be mounted or demounted from the vehicle wheel with the greatest ease while securing reliability and continuous operation to a most efficient degree.

Other advantages will be apparent from the drawings and specifications which follow.

Referring to the drawings:—

Throughout the figures similar numerals refer to identical parts.

Figure 1:
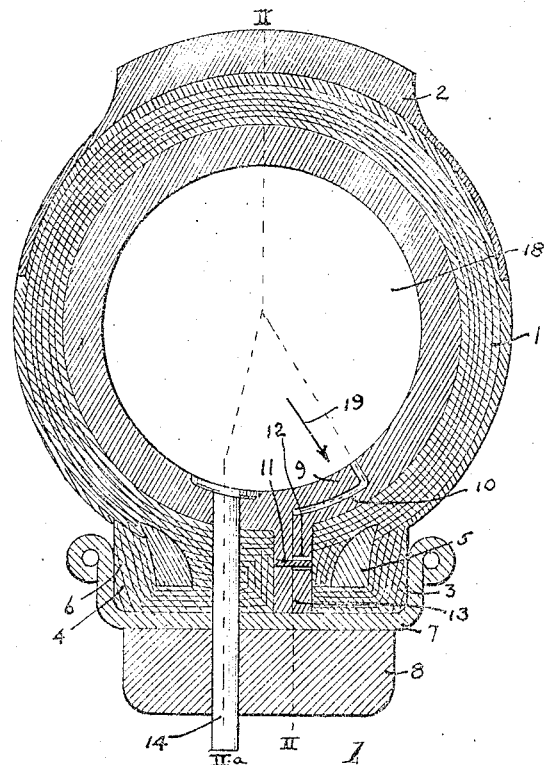
Fig. 1 is a cross section on the line I—I of Fig. 2 of a tire employing my invention mounted on the rim of a conventional wheel, and in deflated condition, the wheel parts being shown somewhat diagrammatically.
Figure 2:
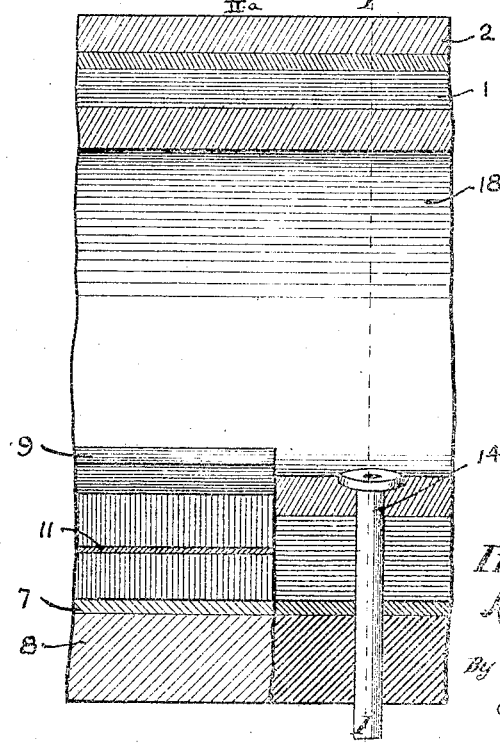
Fig. 2 is a longitudinal section partly on the line II—II and partly on the line II—II<sup>a</sup> of Fig. 1.

A main casing is indicated by the numeral 1, having the tread 2, and bead portions 3, 4, and reinforcing bands 5, 6 respectively, all of which are mounted in a conventional manner upon the rim 7 and felloe 8 of any conventional wheel.

It is understood that the casing is built up of rubber and canvas or other suitable impervious resilient material in a conventional way and provided with a rubber lining integral therewith. The casing is parted between the bead portions 3, 4 and a'ong this parting joint I provide the rubber or other flexible expansion member or flap 9 extending into engagement with and seating in the recess 10, formed in the other side of the casing and sealing therewith under air pressure.

These portions 9 and 10 are preferably formed integral with the casing 1 and are made of or provided with a relatively soft rubber or other suitable contacting surfaces.

At 11 is introduced a tongue of fibre or aluminum or other non-rustable material registering in the groove or recess 12 to facilitate the alignment of the portions 3, 4 and also to prevent dust, dirt and foreign matter from working up through the joint at 13 and damaging the contacting surfaces between 9 and 10.

At 14 is a conventional air tube containing the usual valve whereby air is admitted to the interior 18 of the casing and the casing thereby inflated.

The inflation of the casing causes a heavy pressure in the direction of the arrow 19 against the flap 9 causing it to contact air tight against the surface 10, and enabling the tire to be inflated and retained in inflated condition.

The manner in which the flap 9 seals against the surface 10 is shown clearly in Fig. 1.

It will now be seen that my invention provides a self-locking air tight, single tube tire of simplest, cheapest and most reliable construction.

This application is a division of my pending application, Serial 66,696, filed Nov. 4, 1925.

I claim:—

1. In a vehicle tire a casing having an inner lining of impervious resilient material in the form of a hollow annulus adapted to contain compressed air, with circumferential side locking members and a circumferential joint between said sides, portions of said joint adapted to overlap and be held in air tight contact by air pressure within said annulus and a tongue in one of said portions and a groove in the other portion, said tongue and groove interengaging when said joint is closed.

2. In a vehicle tire a casing having an inner lining of rubber or the like in the form of a hollow annulus adapted to contain compressed air, with circumferential side locking members and a circumferential joint between said sides, portions of said joint adapted to overlap and be held in air tight contact by air pressure within said annulus, the contacting surface portions of said joint faced with relatively soft rubber and positioned at one side of a central plane through said annulus, an inlet tube and valve therein to admit air to the hollow annulus and retain said air compressed therein.

HARRY LINWOOD.